June 19, 1928.
F. J. BAST
1,673,898
APPARATUS FOR ANALYZING GAS
Filed Jan. 24, 1925
3 Sheets-Sheet 3
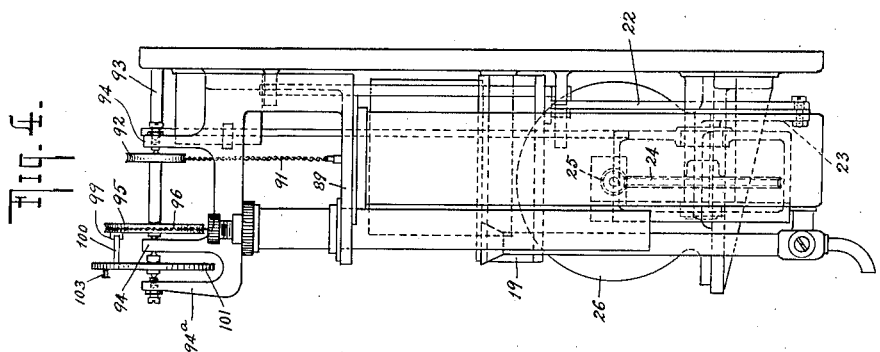
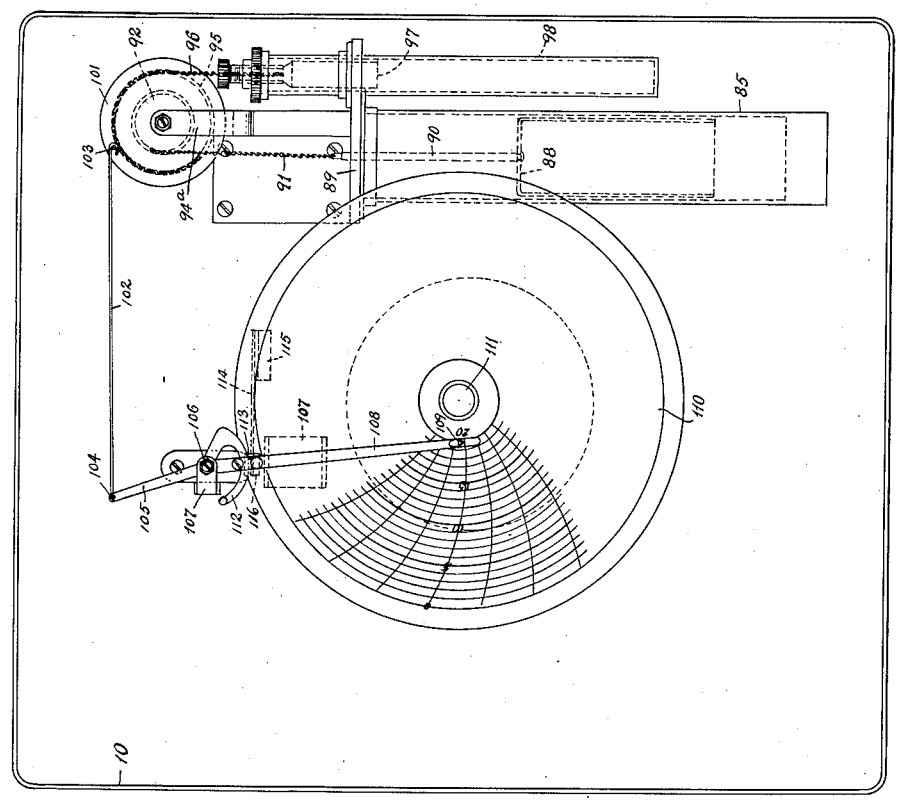
WITNESS
INVENTOR
FRANK J. BAST
BY
ATTORNEYS Patented June 19, 1928.

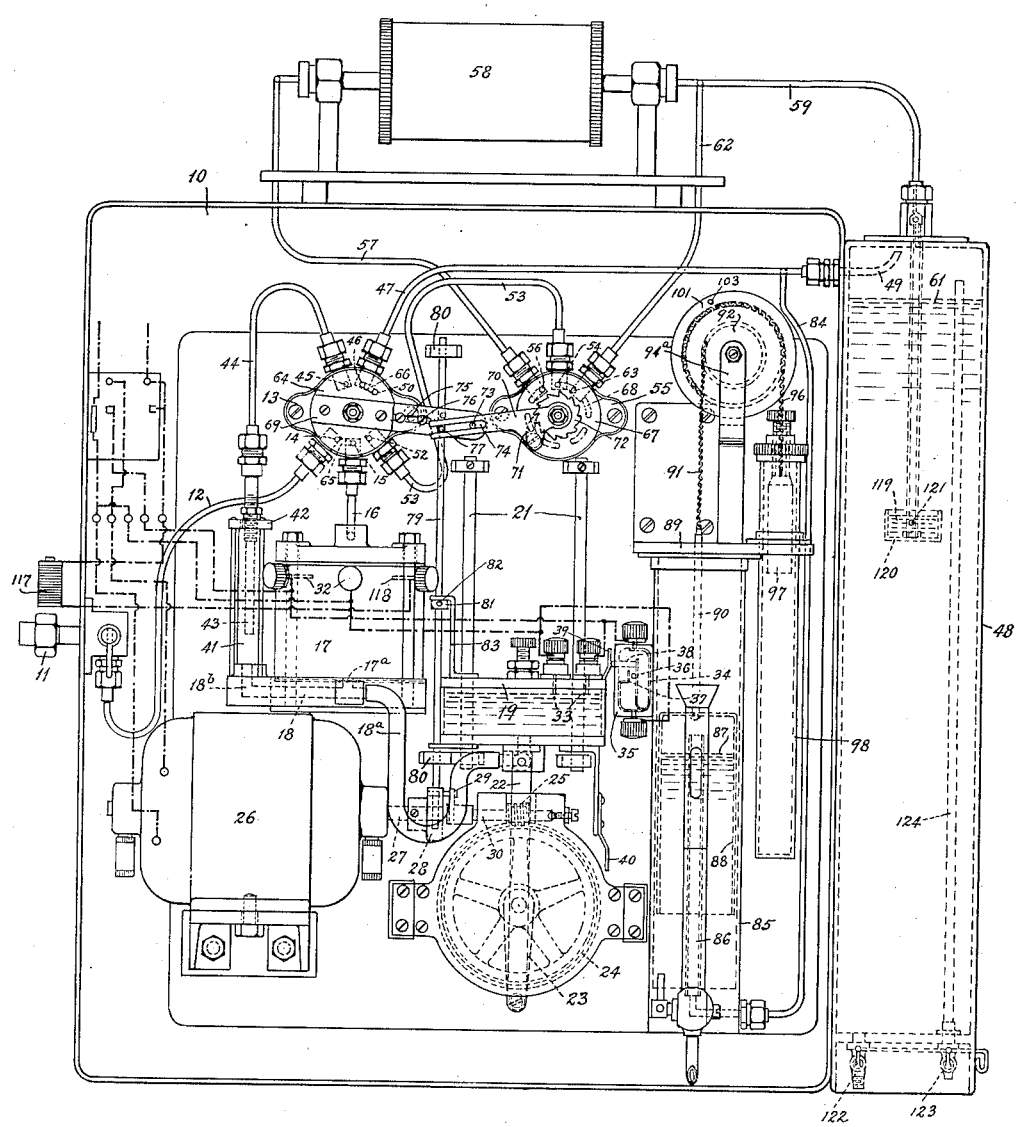

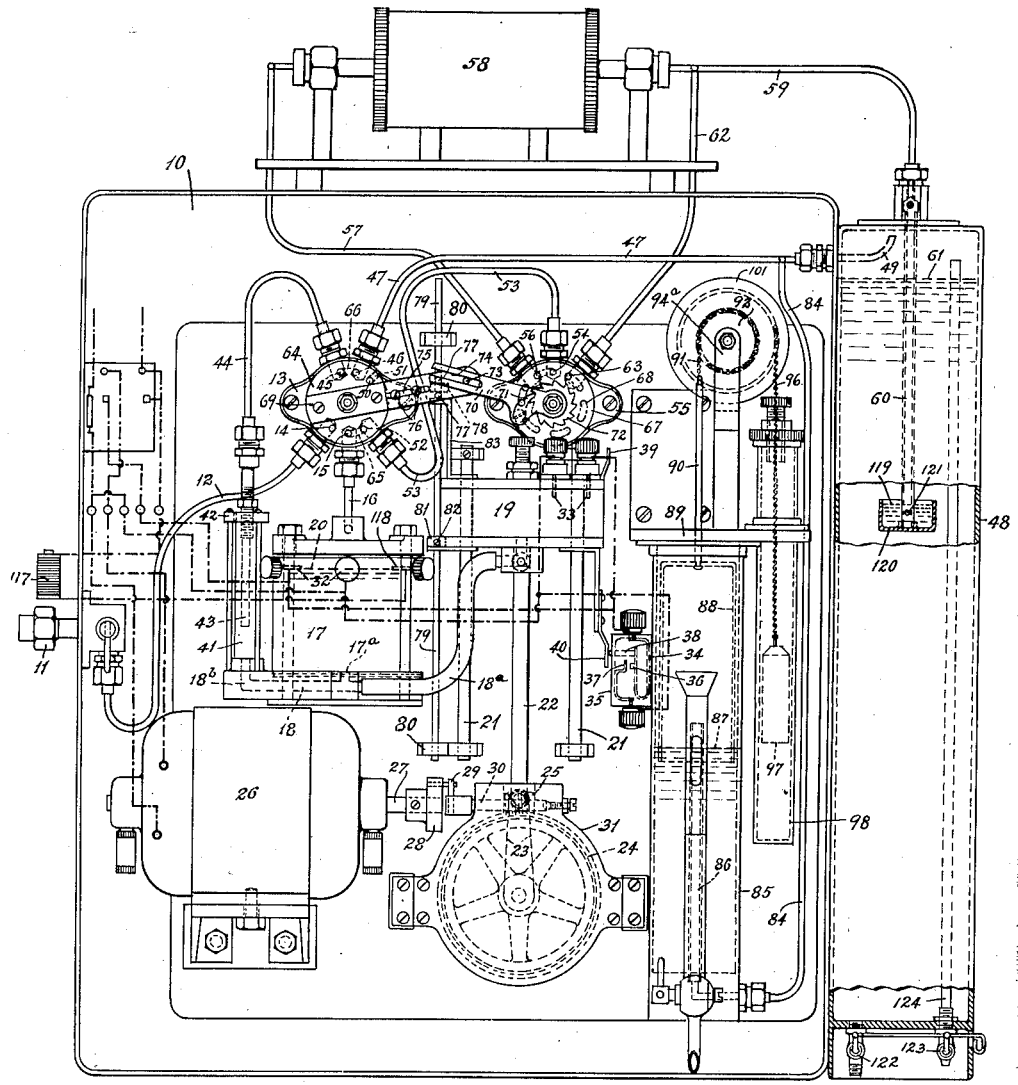

1,673,898

UNITED STATES PATENT OFFICE.

FRANK J. BAST, OF BROOKLYN, NEW YORK, ASSIGNOR TO CHARLES J. TAGLIABUE MFG. CO., OF BROOKLYN, NEW YORK, A CORPORATION OF NEW YORK.

APPARATUS FOR ANALYZING GAS.

Application filed January 24, 1925. Serial No. 4,371.

My invention relates to automatic recorders and more particularly to that class of such instruments which are designed for the automatic analysis of flue gases to determine and record the carbon dioxide, carbon monoxide, methane and hydrogen content thereof. The recorders of this type, which are at present more or less universally used and are operated by water-power in some form and thus require expensive installations to provide such power and furthermore are operatively affected at times by the temperature of the water so that the instrument is not entirely reliable in action. The object of the present invention is to overcome these disadvantages and to provide a recorder of the indicated class which is simple in construction and reliable in action and in which water-power is eliminated and the necessity for the installation of expensive power developing means is consequently avoided. The invention will be fully described hereinafter and the features of novelty will be pointed out in the claims.

In the accompanying drawings, which shown an example of the invention without defining its limits, Figs. 1 and 2 are elevations of the instrument showing the parts in two positions; Fig. 3 is a similar view illustrating the recording mechanism of the instrument and Fig. 4 is a side elevation of the instrument.

In its illustrated form the instrument comprises a supporting base 10 of suitable form and dimensions on which an inlet fixture 11 is mounted so as to be capable of ready connection with the flue or its equivalent from which a sample of the gas to be analyzed is to be taken. The fixture 11 is connected by means of a pipe 12 with a valve casing 13 so as to communicate with a port 14 formed therein, the valve casing 13 being provided with a cooperating port 15 connected by means of a pipe 16 with the upper end of a stationary mercury container 17 fixed in place upon the base 10 in any convenient manner. At its lower end, the mercury container 17 is provided with a passage 17$^a$ in communication with a channel 18 which in turn is connected by means of a flexible tube 18$^a$ with the bottom of a movable mercury container 19 capable of being reciprocated in vertical directions by means of suitable mechanism. A quantity of mercury 20 constituting a mercury column in said chamber is gravitated from one container to the other and vice versa, in the operation of the instrument to alternately create suction and pressure in the stationary mercury container as will be explained more fully hereinafter, it being understood that the containers 17 and 19 are closed and that the mercury 20 is capable of passing out of the same only by way of the tube 18$^a$. In the illustrated example, the movable container is slidably mounted upon vertical guides 21 secured upon the base 10 in any convenient manner as shown in Figs. 1 and 2 and is connected by means of a link 22 with an arm 23; the latter is mounted to rotate with a worm gear 24 rotatably mounted upon the base 10 in mesh with a worm pinion 25. The motive power in the present case comprises an electric motor 26 supported upon the base 10 and connected with a source of electricity in the well known way; the shaft 27 of said motor carries a disk 28 which in turn is connected by means of a crank 29 with the shaft 30 on which the worm pinion 25 is fixed, it being understood that the pinion shaft 30 is journalled in suitable bearings. If desired, the worm gearing 24—25 may be contained and mounted in a protective casing 31 suitably secured upon the base 10 as, for instance, shown in Figs. 1 and 2. Electrical contacts 32 are mounted upon the stationary container 17 and project into the same at predetermined points and similar contacts 33 are fixed upon the movable container 19 and extend into the same to a predetermined point as shown in Figs. 1 and 2; the contacts 32 and 33 form part of the electrical circuit in which the motor 26 is included and constitute means whereby the operation of said motor and its stoppage is automatically controlled. A suitable electric switch 34, preferably contained in a protective casing 35 is also included in the aforesaid electric circuit and is operated to open and close said circuit at the switch contacts 36 and 37 by means of a plunger or pin 38 slidably mounted in the casing 35 and located in the path of operating members 39 and 40 mounted upon and movable with the container 19 as will appear more fully hereinafter. It will be understood that the electrical circuit whereby the motor 26 is operated, is opened and closed at the contacts 32, the contacts 33 and the switch 34 so that said circuit is independently controlled at the aforesaid points; it will further be obvious that other appropriate means for accomplishing the same result may be substituted for the switch 34 and its associated parts if desired.

As shown in Figs. 1 and 2 the stationary receptacle 17, by means of the channel 18 and a branch 18$^b$ thereof, communicates at its bottom with the bottom of a suitably mounted sight glass 41 having a vent 42 in communication with the atmosphere and into which sight glass 41 a tube 43 projects so that its inner end is located at a predetermined point therein. The tube 43 in turn is connected, by means of a pipe 44, with the aforesaid valve casing 13 so as to communicate with a port 45 therein; an adjacent port 46, in said casing 13, is connected by means of a pipe 47 with the upper portion of an absorption chamber 48, said pipe 47 preferably extending into the latter and terminating in an upwardly extending end 49 as shown in Figs. 1 and 2. The valve casing 13 is provided with an additional port 50 and with a vent 51 in operative relation to the aforesaid ports 45 and 46. In addition, the casing 13 includes a port 52 located in operative relation to the previously mentioned ports 14 and 15 and connected by means of a pipe 53 with a port 54 formed in an auxiliary valve casing 55. The latter is provided with an adjacent port 56 connected by means of a pipe 57 with one end of an electric furnace 58 of conventional form and construction mounted upon the base 10, as shown in Figs. 1 and 2; a pipe 59 leads from said electric furnace 58 at its opposite end to the previously mentioned absorption chamber 48 and communicates with a tube 60 extending downwardly into the latter and dipping into a potash solution 61 or its equivalent contained therein. A branch pipe 62 leads from said pipe 59 to another port 63 located in the auxiliary valve casing 55 in operative relation to the ports 54 and 56 as shown in Figs. 1 and 2.

The instrument further includes a main distributing valve 64 rotatably mounted in the valve casing 13 and provided with a channel or recess 65 so located as to cooperate with the ports 14, 15, and 52 and with a similar channel or recess 66 positioned in a manner to cooperate with the ports 45, 46, and 50 and bring about a predetermined distribution of the gases as will appear more fully hereinafter. An auxiliary distributing valve 67 is rotatably mounted in the auxiliary valve casing 55 and is provided with a plurality of channels or recesses 68 so dimensioned and located as to bring about predetermined communications between the ports 54, 56, and 63 as will also be more fully explained further on in the description.

The valves 64 and 67 are operated in the intended manner and at the proper points in the operative cycles of the instrument by suitable mechanism which in the illustrated example includes an arm 69 fixed to the valve 64 and projecting radially outward therefrom; the arm 69 is operatively connected with an auxiliary arm 70 loosely mounted upon the axis of the valve 64 and carrying a pawl 71 arranged for engagement with successive teeth of a ratchet 72, the latter forming part of or being connected to move with said auxiliary valve 67. In the drawings, the connection between the arms 69 and 70 is effected by means of a pin 73 carried by one of the arms and a slot 74 formed in the other arm; as shown in Figs. 1 and 2, the pin 73 is located on the arm 69 and the slot 74 is on the arm 70. In order to provide for adjustment of the connection between said arms to meet existing and varying conditions, one of the arms may be made extensible; thus, as shown, the arm 69 may be made in two sections, one of which is slotted as shown at 75 to accommodate the screws 76 whereby the sections are fixed in adjusted positions. Pins 77 project outwardly from the arm 69 in upper and lower engagement with a block 78 fixed upon a vertically slidable rod 79, as shown in Figs. 1 and 2; the rod 79 is slidably mounted in bearings 80, fixed upon the base 10 and at a distance from the block 78 carries a collar 81 which may be adjustably secured upon said rod by means of a screw 82 or its equivalent. A bracket 83 is mounted upon the movable mercury container so as to partake of the movements thereof and is arranged to engage said block 78 and collar 81 at the proper times to reciprocate said rod 79 and thereby actuate the distributing valves 64 and 67 in the predetermined manner.

As illustrated in Figs. 1 and 2, a branch pipe 84 leads from the pipe 47 to the lower end of a gasometer 85 and communicates with a tube 86 extending upwardly therein beyond the upper level of the sealing liquid 87 contained in said gasometer; as shown in Figs. 1 and 2, the tube 86 terminates at its upper end within the inverted bell 88 which as usual comprises a part of the gasometer, the latter being of any conventional type suitable to the purpose and mounted upon the base 10 by means of a supporting bracket 89 as shown in Fig. 4. The bell 88 is suspended from a stem 90 which passes through the upper head of the gasometer 85 and is vertically slidable therein; the stem 90 in turn is suspended from a flexible connection 91 such as a chain or its equivalent which is attached to a grooved wheel 92 mounted upon a shaft 93. The latter is journalled in bearings 94 which, as shown in Fig. 4, may comprise part of a fixture which includes the bracket 89 and is suitably secured to the base 10; a second grooved wheel 95 is fixed upon the shaft 93 and has attached to its periphery one end of a chain or equivalent flexible connection 96 from the other end of which a counter-weight 97 is suspended; in the preferred arrangement, the weight 97 is contained and vertically movable in a cylinder 98 also supported upon the bracket 89. A lug 99 projects outwardly from one face of the wheel 95 into the path of a pin 100 carried by and projecting from the one face of a disk 101 journalled in axial registry with the shaft 93 in one of the bearings 94 and in a companion bearing 94$^a$ which may also comprise a part of the aforesaid fixture as illustrated in Fig. 4. A link 102 has its one end pivotally connected with a pin 103 which projects from the opposite face of the disk 101 as shown in Figs. 3 and 4, the other end of said link 102 being pivotally connected at 104 with a lever 105; the latter is fixed upon a shaft 106 journalled in a bearing bracket 107 secured to the base 10, said shaft 106 also carrying the customary pen arm 108 which is provided in the usual way with a suitable pen 109. The arrangement is such that the pen arm 108 projects over the surface of a conventional chart 110 carried in the usual manner upon a rotatable spindle 111 operated by clockwork or its equivalent at a predetermined speed in the well known way. A segment or member 112 curved about the axis of the shaft 106 and secured to the latter so as to partake of the movements of the lever 105 and pen arm 108 is positioned in operative relation to a brake 113 located at one end of a flexible arm 114 the other end of which is secured to a block 115 fixed upon the base 10 as shown in Fig. 3. The arm 114 further carries an armature 116 in operative relation to the core of an electro-magnet 117 which is in electrical circuit with contact members 118 located in the stationary mercury container 17, said electromagnet and its associated elements comprising means whereby the operation of the brake 113 is automatically controlled.

The operation of the machine is as follows: Assuming the parts to be in a position of rest in which the receptacle 19 is raised as shown in Fig. 2 and it is desired to start the instrument in operation, either for the purpose of analyzing a single sample of flue gas or to analyze successive samples of flue gas throughout a given operative period and to maintain a record of the conditions thereof in so far as the presence or absence of carbon dioxide, carbon monoxide and other combustible gases such as methane and hydrogen is concerned, the motor 26 is set in motion for instance by closing a suitable control switch. This will cause an operation of the worm pinion 25 and worm gear 24 and accordingly will rotatably swing the arm 23 in a direction to exert a downward pull upon the link 22 and thereby draw the movable mercury receptacle 29 downwardly along the guides 21 from the position shown in Fig. 2 to that of Fig. 1. As the bottom of the receptacle 19 reaches a point below the bottom of the stationary receptacle 17, the mercury 20 in the latter will commence to flow therefrom by gravity through the flexible tube 18 and into the receptacle 19; as the latter continues to move downwardly and finally reaches its lowest position, this gravitation of the mercury from the receptacle 17 to the receptacle 19 continues so that finally the mercury column has been gravitated to the latter receptacle, as shown in Fig. 1.

As the descent of the receptacle begins, the operating member 40, which up to this time has maintained the plunger 38 in an inward position whereby the switch contacts 36 and 37 are separated, gradually moves away from said plunger and thus permits the switch to close. In this way the electrical circuit in which the motor 26 is included and which was broken at the contacts 32 as the mercury 20 in the receptacle 17 dropped away from the same, is maintained closed until the receptacle 19 reaches its lowest position in which the aforesaid circuit is again broken by the action of the operating member 39 on the plunger 38. The receptacle 19 accordingly remains at rest in its lowest position to permit the aforesaid transfer of mercury and until the mercury in rising in said receptacle 19 engages the contacts 33 therein.

During the operative steps described so far, the mercury column 20 in descending in the receptacle 17 creates a suction therein whereby a charge of gas to be analyzed is drawn through the inlet 11, pipes 12 and 16 into said receptacle 17, it being understood that at this stage the distributing valve 64 is in a position in which the ports 14 and 15 are connected through the medium of the channel 65. The arrangement is such that the level of the mercury 20 in the receptacle 19, when the latter is in its lowest position, is above the channel 18 of the receptacle 17 and accordingly fills said channel 18 and thereby seals the latter and its branches 17$^a$ and 18$^b$ and thus prevents any of the gas from passing into said sight glass 41; a quantity of such gas is accordingly trapped in the receptacle 17, such quantity in the present case amounting to 120 c. c. As soon as the mercury 20 in the receptacle 19 reaches the contacts 33 the aforesaid electrical circuit is again closed through the last mentioned contacts and the motor 26 is again caused to operate. By the continued action of the worm-gearing 24—25, the arm 23 and the link 22, the receptacle 19 is accordingly moved upwardly on the guides 21 from the position shown in Fig. 1 to that of Fig. 2. As this occurs, the mercury 20 passes from the receptacle 19 through the tube 18 and back into the receptacle 17 by gravity and accordingly, by dropping away from the contacts 33, breaks the electrical circuit at this point; the plunger 38 having in the meantime, however, been released from engagement with the operating member 39, which has moved upwardly with the receptacle 19, the contacts 36 and 37 have been engaged with each other so that said electric circuit is maintained through the switch 35. As the operative cycle just described takes place, the bracket 83 will be carried upwardly by the receptacle 19 and will finally engage the lower pin 77 and actuate the arms 69 and 70 whereby the distributing valve 64 will be shifted to adjust the channel 65 from the position shown in Fig. 1 to that of Fig. 2 in which said channel 65 connects the ports 15 and 52; by the same movement the channel 66 of the valve 64 has been shifted to connect the ports 45 and 46. At the same time, the pawl 71 and ratchet 72 will rotate the auxiliary distributing valve 67 one step whereby the ports 54 and 56 will be brought into communication with each other by means of one of the channels 68 as shown in Fig. 2. The operative end of the bracket 83 is located at a predetermined distance above the container 19 so that the above described shifting of the valves 64 and 67 takes place before any material transfer of the mercury 20 back to the receptacle 17 has been made; furthermore, because of the engagement of the pins 77 with the block 78, the rod 79 will be shifted in an upward direction. As the upward movement of the receptacle 19 now continues, it will finally reach the upper position indicated in Fig. 2 in which the operating member 40 acting on the plunger 38 again breaks the electrical circuit and brings said receptacle 19 to a temporary rest in said raised position, at the end of what may be termed the CO stroke; during this period of rest, the mercury 20 will gradually leave the receptacle 19 by gravity and correspondingly rise in the receptacle 17. As this occurs, the rising mercury will act as a piston in the receptacle 17 and the previously entrapped gas therein will be forced thereby through the pipe 16 and passed into the pipe 53 through the port 15, channel 65 and port 52. From the pipe 53 the gas flows through the port 54, channel 68 and port 56 into the pipe 57 and thence through the electric furnace 58 into the pipe 59. As the gas thus flows into and through the electric furnace 58, any combustible constituents contained therein, such as CO, $CH_4$, and $H_2$, that is carbon monoxide, methane and hydrogen, will be consumed or burned; any carbon monoxide in said gas is burned to $CO_2$, any hydrocarbon gases are burned to $CO_2$ and water and any hydrogen is burned to water during the passage of the gas through said electric furnace.

From the pipe 59, the gas passes into the tube 60 of the absorption chamber 48 and flows through the potash solution 61 contained in said chamber; in its passage through said solution, the latter will take up any $CO_2$ and water which may be contained in the gas as a result of its passage through the electric furnace. The residual gases leave the absorption chamber 48 through the end 49 of the pipe 47 and flow through the latter and the port 46, channel 66 and port 45 into the pipe 44 and thence into and through the tube 43 into the sight glass 41 from which it passes to the atmosphere through the vent 42 until such time as the mercury 20 reaches the lower end of the tube 43 and thereby seals the same. The first portion of the gas sucked into the receptacle 17 is thus used as a scavenging medium to sweep before it the gas in the several tubes and channels remainining from the previous analysis. This portion corresponds to about 20 c. c. of the original gas drawn into receptacle 17 and the unabsorbed constituents thereof are allowed to escape into the atmosphere through vent 42. As previously stated, the sight glass 41 is in communication with the receptacle 17 through the medium of the channel 18 and its branches 17ª and 18ᵇ so that as the mercury 20 rises therein as a result of the lifting of the receptacle 19, it will correspondingly rise in said sight glass. The tube 43 is set at such a height in the latter that it will become sealed by the mercury and the escape of the gas to the atmosphere will be checked to trap a predetermined quantity such as, for instance, 100 c. c. of gas within receptacle 17. This trapped 100 c. c. of the gas, upon which the test is actually made, flows from the receptacle 17 and along the same path as that of the first 20 c. c. thereof just described. However, the conduit represented by the pipe 44, port 45, channel 66, port 46 and pipe 47 now being closed because of the rise of the mercury in sight glass 41, the unabsorbed components of the original 100 c. c. of gas will flow from the pipe 47 through the branch pipe 84 into the gasometer 84 and through the tube 86 to the interior of the bell 88 thereof. If no $CO_2$ and/or CO was present in the sample of gas under analysis, the bell 88 will be shifted to its uppermost position, otherwise the adjustment of said bell will be to an intermediate position in accordance with the reduction in volume of said gas due to the removal of $CO_2$ and CO therefrom. In any case, the raising of the bell 88 will cause the weight 97 to rotate the shaft 93 in a direction to wind the chain 91 upon the wheel 92 and to unwind the chain 96 from the wheel 95; as this occurs, the lug 99, by engagement with the pin 100, will rotate the disk 101 to draw the link 102 to the right in Fig. 3 and to swing the lever 105 correspondingly. In this way, the pen arm 108 is swung relatively to the chart 110 to cause the pen 109 to record thereon the amount of CO and $CO_2$ contained in the aforesaid gas; if none was present, the record will be zero on said chart; otherwise the record will be such as to indicate the amount of CO and $CO_2$ in the gas as taken from the flue or its equivalent. As the lever 105 and pen arm 108 are thus operated, the segment 112 will be correspondingly operated and, in cooperation with the brake 113, will hold the pen arm in its adjusted position at the end of the aforesaid analyzing step for the purpose to be more fully set forth hereinafter. When the mercury 20 has been transferred back to the receptacle 17 because of the lifting of the receptacle 19, it will finally again close the operative electric circuit through the contacts 32, and thus again start the motor 26; the renewed operation of the latter accordingly brings about a downward movement of the receptacle 19 and a corresponding gravitation of the mercury 20 from the receptacle 17 back to the receptacle 19. In this way a second charge of gases is drawn into the receptacle 17 in the same way as previously described. As the aforesaid downward movement of the receptacle 19 takes place, the bracket 83 will engage the collar 81 and thus draw the rod 79 downwardly from the position shown in Fig. 2 to the position shown in Fig. 1. This causes a corresponding actuation of the valve arms 69 and 70 whereby the channel 66 of the valve 64 is shifted to connect the ports 46 and 50 and thereby bring the pipe 47 into communication with the vent 51. The gas contained in the gasometer 86 is thus permitted to escape, by way of the tube 86, pipes 84 and 47 through said vent 51 to the atmosphere. As the bell 88 of the gasometer thus drops, it exerts a pull on the chain 96 and rotates the wheel 92, shaft 93 and wheel 95 in a direction to move the lug 99 away from the pin 100; the pen arm and its associated parts thus remaining in the position in which they are held by the action of the brake 113 on the segment 112. As the above described adjustment of the valve 64 takes place, the channel 65 will be shifted to connect the ports 14 and 15 and to thus again bring the receptacle into communication with the inlet fixture 11. At the same time, the corresponding actuation of the arm 70 has caused the pawl 71 to ride back over the ratchet 72 and to engage a new tooth, without, however, performing any work, during such movements.

As the operation of the mechanism continues, the receptacle 19 will again be lifted to cause the mercury 20 to gravitate back into the receptacle 17 and to accordingly again develop a pressure in said receptacle 17 whereby the second charge of gas will be forced therefrom into the pipe 16 in the same way as previously described. As the receptacle 19 thus again rises and completes what may be termed the $CO_2$ stroke, the member 83 will again actuate the valve arms 69 and 70 in a manner to shift the channel 65 of the valve 64 into communication with the pipe 53. At the same time, the valve 67 will be adjusted, by the action of the pawl 71 upon the ratchet 72, to shift a channel 68 into connection with the ports 54 and 63 so that, at this stage, the pipes 53 and 62 are in communication with each other. The second charge of gas, by the pressure developed by the rising mercury in the receptacle 17, will now pass through the pipe 16 and ports 15 and 52 into the pipe 53; from thence the gas passes through the port 54, channel 68 and port 63 of the valve 67 into the pipe 62 and through the pipe 59 directly into the absorption chamber 48 without however, first passing through the electric furnace 58 as in the previous step. In passing through the potash solution 61, whatever $CO_2$ is contained in the gas is absorbed therefrom so that the sample of gas is reduced in volume in accordance with whatever percentage of $CO_2$ was absorbed, this reduction however being less than in the previous step in which the gas, in addition to its normal content of $CO_2$, contained such $CO_2$ as may have resulted from the passage through the furnace of the previous charge of gas. As in the previous stage, the residue gas now passes from the absorption chamber 48 through the end 49 and into the pipe 47 and continues to flow therethrough and to the atmosphere through the vent 42 until the lower end of the tube 43 in the sight glass 41 is again closed by the mercury 20 at which time a predetermined amount, as for instance 100 c. c. of gas has been trapped. From now on, the gas passes from the pipe 47 through the pipe 84 into the gasometer 85 and causes the bell 88 thereof to be operated as previously set forth herein and the wheel 95 to be rotated by the action of the weight 97 to shift the lug 99 to a new position, which because of the lesser movement of the bell, will be at a distance from the position in which the pin 100 is held by the action of the brake 113. As the mercury in the receptacle 17 has at the same time engaged the contacts 118 and thereby closed the electrical circuit in which the electromagnet 117 is located the latter will be energized and will attract the armature 116 and thereby draw the brake 113 away from the segment 112. The pen arm 108 being thus released will drop back, by gravity, on the chart 110 until arrested by the engagement of the pin 100 with the stop 99, the latter, as previously stated, having been previously shifted to a given position by the operation of the bell 88 and its associated parts. The difference between the previous position of the pen 109 on the chart 110 and the position it assumes by the last previous operations constitutes a record of the $CO_2$ content of the gas.

The pen arm 108 is held in its newly adjusted position by the action of the brake 113 upon the segment 112 and remains so until the next CO stroke is completed, whereupon the pen arm 108 will be shifted on the chart to again indicate the CO content of the gas; this movement of the pen arm 108 is made with the brake 113 in its operative position. It will be understood that the friction of the latter is not sufficient to prevent such actuation but is overcome until the new adjustment of said pen arm is completed, whereupon the brake again acts to fix the pen arm in place.

It will thus be seen that during the operation of the apparatus the pen arm is shifted back and forth on the chart in a manner to produce a record thereon in the form of a continuous line in contradistinction to a record comprising lines of varying length as has heretofore been the case.

The operations above set forth are repeated throughout a given operative cycle of the instrument and result in an accurate analysis of flue gases and a reliable record of the amount of CO and $CO_2$ contained therein. To recapitulate, the apparatus or instrument comprises a collecting vessel adapted to receive charges of gas to be analyzed, a fluid column and means whereby the fluid column is gravitated to alternately create suction and pressure in said vessel whereby a charge of gas is first drawn into the latter and then expelled therefrom. In the illustrated example of the invention the collecting vessel is shown in the form of a chamber 17 and the fluid column is exemplified by a supply of mercury 20; the gravitation of the fluid column is accomplished in the example shown by raising and lowering a second chamber 19 which is connected with the first chamber 17 by means of a flexible connection 18. In addition, the apparatus includes means for determining the content of a predetermined gas and recording mechanism for recording the result, the means being exemplified by the electric furnace 58, the absorption chamber 48, and the gasometer 85 while the recording mechanism is exemplified by the chart 110, the pen arm and pen 108—109 and the associated elements operated by the bell of the gasometer and actuating the pen arm and pen. The instrument in all of its forms does away entirely with the use of water as a motive power and substitutes therefor an electrically operated motor automatically controlled in a novel and effective manner. The new instrument avoids all of the disadvantages of existing water power instruments and includes all of the advantages thereof and in addition possesses advantages not found in existing instruments.

If the apparatus is intended to record only the percentage of $CO_2$ which is contained in the gas, the furnace 58 may be omitted, in which case the pipes 53 and 62 would be connected directly with each other or in other words be replaced by a single pipe leading directly to the absorption chamber 48. The same result may be obtained in an apparatus constructed as illustrated by removing or disconnecting the valve arm 70 and fixing the valve 67 in a position in which one of the channels 68 establishes communication between the ports 54 and 63 and accordingly between the pipes 53 and 62.

To avoid the possibility of having any of the potash solution 61 drawn from the chamber 48 back through the tube 60 during the operation of the apparatus a suitable preventative means is preferably provided. In the illustrated example, this means comprises a mercury seal 119 contained in a receptacle 120 secured, for instance, upon the inner end of the tube 60 which in such case is provided with one or more openings 121 as indicated in Figs. 1 and 2, it being understood that the supply of mercury 119 is sufficient to normally extend above such openings. The gases which enter through the tube 60 pass out through the openings 121 and through the mercury 119 into the potash solution 61; any suction which may be developed in the tube 60 because of the operation of the apparatus will be exerted upon the mercury 119 which because of its specific gravity will, at most, be drawn into said tube only to a relatively slight extent but will prevent any of the solution 61 from passing into said tube. The sealing means represents a precautionary arrangement which in many cases may be found unnecessary.

In order to permit the absorption chamber 48 to be readily emptied and filled, as required, I prefer to provide a cock 122 at the bottom thereof which may include a screwthreaded end or be otherwise constructed for easy connection with a pump or the like. In addition, it is preferred to provide a second cock 123 also located at the bottom of the chamber 48 and communicating with a tube 124 which extends upwardly inside of the chamber 48 and projects upwardly beyond the level of the solution 61 therein. The cocks are connected so as to operate simultaneously and so that both open and close at the same time. Thus, when it is desired to empty the chamber 48, both cocks are opened whereupon the solution 61 will flow out through the cock 122 and air will flow in through the cock 123 and the tube 124 as the solution is removed; similarly when it is desired to fill the chamber 48, the cock 122 is connected with a suitable pump and both cocks are opened. The solution 61 is thus forced into the chamber 48 and at the same time the air therein is simultaneously and correspondingly forced out through the tube 124 and cock 123. With the arrangement described the formation of a vacuum during emptying and an air cushion during filling is prevented and both emptying and filling of the chamber 48 are readily accomplished.

Various changes in the specific form shown and described may be made within the scope of the claims without departing from the spirit of my invention.

I claim:

1. In a recording instrument including means for determining the content of a predetermined gas, and a collecting vessel adapted to receive a charge of gas, the combination of a fluid column and means whereby said fluid column is gravitated to alternately create suction and pressure in said vessel whereby the charge is first drawn into said vessel and then expelled therefrom and conducted to said content determining means, and means including the fluid for controlling the gravitating means.

2. In an instrument for flue-gas analysis including means for determining the flue gas content, a collecting vessel adapted to receive a charge of gas, a fluid column, means whereby said fluid column is gravitated to alternately create suction and pressure in said vessel whereby the charge is first drawn into said vessel and then expelled therefrom and conducted to said content determining means, valve-mechanism actuated in predetermined sequence with said fluid column to control the passage of the gas to and from said vessel and to said content determining means, and means including said fluid for controlling the actuation of the fluid gravitating means.

3. In an instrument for flue gas analysis including means for determining the flue gas content thereof, the combination of a pair of chambers connected with each other, one of said chambers being adapted to receive a charge of gas and one of said chambers being movable upwardly and downwardly beyond the other chamber, a fluid in said chambers arranged to be gravitated from one to the other and vice versa as the movable chamber rises and falls to thereby alternately develop suction and pressure in the gas receiving chamber whereby the charge is first drawn into the latter and then expelled therefrom and conducted to the content determining means, means for periodically moving the movable chamber upward and downward, and means including the fluid for controlling the actuation of the last mentioned means.

4. In an instrument for flue gas analysis including means for determining the flue gas content thereof, the combination of a stationary chamber adapted to receive a charge of gas, a movable chamber movable upwardly and downwardly beyond the stationary chamber, a flexible connection between said chambers, and a fluid in said chambers arranged to be gravitated from one chamber to the other and vice versa as the movable chamber rises and falls to thereby alternately develop suction and pressure in said stationary chamber whereby a charge of gas is first drawn into the latter and then expelled therefrom and conducted to the content determining means, means for periodically moving the movable chamber upward and downward to cause gravitation of the fluid, and means including the fluid for actuating the last mentioned means at predetermined intervals.

5. In an instrument for flue gas analysis including means for determining the flue gas content thereof, the combination of a stationary chamber for receiving a charge of gas, a movable chamber movable upwardly and downwardly beyond the stationary chamber, a flexible connection between the lower portions of said chambers, a mercury column in said chambers adapted to be gravitated from one chamber to the other and vice versa as the movable chamber rises and falls to thereby alternately develop suction and pressure in said stationary chamber whereby a charge of gas is first drawn into the latter and then expelled therefrom an electric motor for actuating the movable chamber, an electric circuit for said motor adapted to be completed and broken by said fluid and valve-mechanism actuated in predetermined sequence with said mercury column to control the passage of the gas to and from said stationary chamber and to the content determining means.

6. In an instrument for flue gas analysis including means for determining the flue gas content thereof, the combination of a stationary chamber for receiving a charge of gas, a movable chamber movable upwardly and downwardly beyond the stationary chamber, a flexible connection between the lower portions of said chambers, a column in said chambers adapted to be gravitated from one chamber to the other and vice versa as the movable chamber rises and falls to thereby alternately develop suction and pressure in said stationary chamber whereby a charge of gas is first drawn into the latter and then expelled therefrom, a gas-inlet connection, a pipe leading to the stationary chamber, a system of pipes leading to said content determining means, valve-mechanism for controlling the passage of the gas through said gas-inlet connection, pipe and system of pipes and means connected with said movable chamber for actuating said valve-mechanism in predetermined sequence with said mercury column.

7. In an instrument for flue gas anaylsis, the combination of an electric furnace, an absorption chamber, a system of pipes leading to said furnace and said absorption chamber, a stationary chamber, a movable chamber movable upwardly and downwardly beyond the stationary chamber, a flexible connection between the lower portions of said chambers, a mercury column in said chambers adapted to be gravitated from one chamber to the other and vice versa as the movable chamber rises and falls to thereby alternately develop suction and pressure in said stationary chamber whereby a charge of gas is first drawn into said stationary chamber and then expelled therefrom, valve-mechanism controlling said system of pipes and means operated by said movable chamber to actuate said valve-mechanism in predetermined sequence with said mercury column to direct the expelled gas through both the furnace and the absorption chamber or through only the latter chamber.

8. In an instrument for flue-gas analysis, the combination of means for determining the flue-gas content, a first chamber for receiving a charge of gas, a second chamber, one of said chambers being movable upwardly and downwardly beyond the other, a column of mercury in said chambers arranged to be gravitated from one chamber to the other and vice versa as the movable chamber rises and falls to thereby alternately develop suction and pressure in the first chamber whereby a charge of gas is first drawn into the latter and then expelled therefrom and conducted to said content determining means, an electric motor for operating said movable chamber, an electrical circuit including contact terminals in said chambers, said circuit being closed at said terminal contacts alternately in said chambers by the mercury as it rises therein and switching means in said circuit operated by said movable chamber for closing said electrical circuit during gravitation periods in which the mercury is out of engagement with the aforesaid terminal contacts.

In testimony whereof I have hereunto set my hand.

FRANK J. BAST.